3,081,277
AMINO-ALDEHYDE MOLDING RESINS MODIFIED WITH POLYACRYLAMIDE OR METHYLOL POLYACRYLAMIDE
Henry P. Wohnsiedler, Noroton, and Richard H. Hunt, North Haven, Conn., assignors to American Cyanamid Company, New York, N.Y., a corporation of Maine
No Drawing. Filed Feb. 28, 1962, Ser. No. 176,417
20 Claims. (Cl. 260—45.2)

This invention relates to novel thermosetting resinous compositions particularly useful in molding, laminating and other related arts. More particularly, this invention relates to heat-curable, substantially homogeneous compositions comprising an amino-aldehyde resin and a substantially homopolymeric polyacrylamide or a methylol derivative thereof, with or without a filler. Further, this invention specifically concerns novel thermosetting resinous compositions comprising formaldehyde condensation products of melamine, benzoguanamine or urea modified with water-soluble polyacrylamides or water-soluble or -insoluble methylol derivatives of polyacrylamide and the cured products thereof which exhibit a high degree of dimensional stability.

This application is a continuation-in-part of our co-pending application Serial No. 685,404, filed September 23, 1957, now abandoned.

It is an object of this invention to provide thermosetting resinous compositions for molding purposes which comprise substantially homogeneous blends of an amino-aldehyde resin condensate and homopolymeric acrylamide or a methylol derivative thereof.

It is also an object of this invention to provide thermosetting resinous compositions comprising melamine-formaldehyde, benzoguanamine-formaldehyde, melamine-benzoguanamine-formaldehyde or urea-formaldehyde condensates blended with substantially homopolymeric acrylamide or methylolated derivatives thereof which, when molded, possess excellent dimensional stability, color retention and translucence.

A further object of this invention is to provide resinous laminating syrups which, when employed to produce laminates, result in cured products exhibiting excellent post-formability characteristics.

These and other objects of this invention will be more fully outlined in the discussion and examples appearing hereinbelow.

In the field of molded thermosetting aminoplast resins, the use of melamine or benzolguanamine resins has resulted in molded products which exhibit relatively good resistance to crazing or cracking, a type of failure which results from stresses developed in the molded article, possibly during the molding operation itself, but more commonly in a use period subsequent thereto. Urea-formaldehyde molding compositions are more prone to failures of this type than those compositions wherein the amidogen component is a symmetrical triazine, such as melamine or benzoguanamine. Nevertheless, in spite of the generally good properties associated with moldable aminoplast condensation products in this regard, there is an existing need for improving the dimensional stability of cured aminoplast resins used in certain types of molding applications. For instance, many applications require the molding of the aminoplast resin composition into a unitary object consisting of integral sectional parts of varying thicknesses. This variation in thickness of the component sectons or parts is directly related to the tendency of the molded object toward developing internal stresses, which in turn manifest themselves as crazing and cracking failures. Details of the attributable factors causing such failures will be discussed hereinbelow.

The term "dimensional stability" as applied in the art of molding includes two fundamental types of dimensional changes. One type known and characterized as mold shrinkage is, as its name implies, the difference in dimensions which develops between the cooled mold, usually a metallic form, and the cooled molded object formed therein. This dimensional difference is caused principally by differences in the coefficients of cubical expansion of the metallic mold form and the molded resinous composition. Mold shrinkage is not particularly objectionable because of the uniform manner in which all of the sections of the molded article contract. Moreover, mold shrinkage can usually be compensated for by mold design, and thus the use of mere mechanical expedients largely offsets any deleterious effects that may be caused by this shrinkage phenomenon. The other dimensional change confronted in the molding of aminoplast resin compositions, and the one with which this invention is particularly concerned, is contraction in dimenson due to causes other than the dimensional changes induced by the thermal gradients mentioned above. This second type of dimensional instability may be referred to as aging shrinkage, since it occurs during use of the molded object. This type of shrinkage is believed to be directly associated with the moisture content of the molded object, and it is further believed that the causative factor of this type of instability is the free moisture present in the molded article after molding or generated through progressive condensation during high temperature aging of the article. Aging shrinkage is considered very objectionable in the molding art because indications are that it results in the crazing and cracking failures mentioned above. The tendency toward such failures is particularly pronounced in molded objects which are in the form of unitary articles having component sections varying considerably in thickness. It can be readily appreciated that in the course of time the free moisture will escape more readily from the thinner portions of the molded object than from the bulkier portions, and every indication induces those skilled in the art to believe that when a state of moisture imbalance is reached so as to cause dimensional instability, the system will adjust to relieve itself of built-up dimension stresses by craking or crazing.

Various methods have been suggested in the prior art for improving the dimensional stability, and particularly the type of instability due to moisture influences, of amino-aldehyde resins. Thus, for example, it has been suggested that melamine-formaldehyde resins be modified with certain unrelated polymeric ingredients which do not coreact to any appreciable extent with the amino-aldehyde resin but, nevertheless, functionally co-operate therewith, thus resulting in a composition less sensitive to moisture influence than the amino-aldehyde resin itself. Among such modifies which may be mentioned are polymethyl acrylate, polyacrylonitrile, copolymer of acrylonitrile with certain alkyl acrylates or N-mono-(lower alkyl) acrylamides, polyesters, and the like. Reference is made hereto the application of Henry P. Wohnsiedler, Serial No. 484,580, filed January 27, 1955, now abadoned, which discloses resinous compositions comprising amino-plast resins and copolymers of acrylonitrile with acrylamide or methylol acrylamide which, when cured to an infusible and insoluble state, exhibit dimensional stability properties.

The present invention is a specific improvement upon the invention disclosed and claimed in the aforesaid application. We have found that when amino-aldehyde resinous compositions are modified with polyacrylamide or methylol derivatives thereof, products are obtained having dimensional stability characteristics in the order possessed by the products of the aforesaid Wohnsiedler application containing the same aminoplast resin. Our surprising discovery, however, was in finding that the compositions of the present invention possess low sensitivity to moisture influences in spite of the strong hydrophilic properties of their polyarcylamide or polymethylol acrylamide components. It was found that cured molding compositions comprising an amino-formaldehyde resin and polyacrylamide or methylolated derivatives of polyacrylamide are no more sensitive to moisture absorption than the corresponding compositions modified with hydrophobic polymeric materials. We have also found that although modifying amino-aldehyde resinous condensates with polyacrylamide or polymethylol acrylamide results in cured products having a relatively high free moisture content, there is no great propensity for the cured molded article to lose this moisture and thereby undergo crazing and cracking failures. While we do not wish to be bound by any particular theory as to why articles molded from the compositions of the present invention show exceptional dimensional stability properties, it is believed that the inclusion of the polyacrylamide or polymethylol acrylamide results in the hydrogen-bonding of the free moisture within the molded article, permanently binding the free moisture content within the cured molding composition.

In addition to having dimensional stabilities of the order possessed by aminoplast resins modified with polyacrylonitrile or copolymers containing acrylonitrile, articles molded from the compositions of the present invention also possess the property of being resistant to color changes which predominantly occur during the process of curing or during post-curing aging of articles prepared from the latter type compositions. Our novel products do not develop any perceptible degree of yellowing during the curing process as do amino-formaldehyde resin compositions modified with polyacrylonitrile or copolymers containing acrylonitrile, which fault of the latter compositions limits their use to industrial applications.

Another surprising discovery was the fact that filled and unfilled articles molded from the compositions of the present invention are significantly superior in translucence to article molded from aminoplast resins modified with copolymers of acrylamide or N-substituted acrylamides, e.g., copolymers of acrylamide with acrylonitrile or ethyl acrylate, as disclosed in U.S. Patent No. 2,841,571 to H. P. Wohnsiedler, or copolymers of N-alkyl acrylamides, such as N-methyl acrylamide, with acrylonitrile, as disclosed in U.S. Patent No. 2,582,303 to H. P. Wohnsiedler et al., as evidenced by the fact that articles molded from the compositions of the present invention exhibit increased luminous transmittance and, correspondingly, decreased luminous reflectance as compared to articles molded from the aforementioned copolymer-modified materials. An affidavit and exhibit supporting this fact was filed in applicant's parent case, Serial No. 685,404, and is incorporated herein by reference.

A slight measure of translucence is highly desirable in aminoplast resin molded articles, and especially in those which are pigmented, inasmuch as it not only imparts a brilliancy and depth of color to such articles but also permits greater flexibility in pigmenting them. Furthermore, where an aminoplast molding composition is to be used to prepare a molded light diffuser or reflector, a certain degree of translucence is an essential requirement. Consequently, the novel compositions of the present invention are particularly useful in preparing light colored molded articles which are resistant to yellowing, have a pleasing degree of translucence, and also have improved dimensional stability as compared to the corresponding unmodified aminoplast resins. Finally, it has also been observed that when our novel products are employed as the resinous component of laminates, improvements in the post-formability characteristics of the cured laminates are achieved.

The thermosetting amino-aldehyde resins which, when modified with polyacrylamide or methylolated derivatives of polyacrylamide, constitute the novel resinous molding compositions of this invention, may be prepared by reacting an aldehyde with an amidogen compound. The term amidogen employed herein contemplates compounds containing an aldehyde-reactable amido or amino group or groups. The preferred amidogens that can be used to prepare amino-aldehyde condensates useful in the molding compositions of this invention are melamine, benzoguanamine, urea, and mixtures thereof. However, other amidogens may be employed alone or preferably in combination with the preferred amidogens, with the preferred amidogen constituting the major portion of the amide-bearing components. Included among these other amidogens are triazines containing at least one amino group, e.g., formoguanamine, acetoguanamine, 2-amino-1,3,5-triazine, 2,4,6-tris(monoalkyl amino)-1,3,5-triazines, e.g., 2,4,6-tris(ethylamino)-1,3,5-triazine, 2,4,6-tris(arylamino)-1,3,5-triazines, e.g., 2,4,6-tris(phenylamino)-1,3,5-triazine, melam, melem, melon, 2-chloro-4,6-diamino-1,3,5-triazine, 2-amino-4-hydroxy-6-phenyl-1,3,5-triazine, 2,4-diamino-6-methylamino-1,3,5-triazine, ammeline, ammelide, and the like. In addition to these aminotriazines, one may use diazine amidogens such as 2,5-diamino-1,3,4-thiadiazine singly or in combination with said triazines. Also, it is contemplated that other amidogens, such as certain guanazoles, e.g., guanazole or guanazoguanazole, or biguanides such as phenyl biguanide, may be used. Of the ureas, carbamide or urea is preferred. However, thiourea, biuret, and dicyandiamide may be used singly or in combination with urea or in combination with the amidogens mentioned hereinabove.

The thermosetting amino-aldehyde condensates employed in the compositions of the present invention are prepared by effecting condensation of the aldehyde reactant with the amidogen. The ratio of aldehyde to the aldehyde-reactable amidogen can be varied over a wide range depending, for example, upon the number of aldehyde-reactable amide groups in the amidogen and upon the particular properties desired in the final condensation product. The aldehyde, e.g., formaldehyde, can be used in an amount sufficient to react with from one to all of the reactive hydrogens of the amido or amino groups in the amidogen. Thus, one can use, for instance, from 1 to 6 mols of the aldehyde per mol of amidogen when the amidogen compound consists of melamine. When one employs either benzoguanamine or urea, one may employ 1 to 4 mols of aldehyde per mol of said amidogens. The preferred molar ratios of aldehyde to amidogen are 1.0 to 3.0 when the amidogen is melamine, and 1.0 to 2.0 when the amidogen employed is benzoguanamine or urea.

The initial condensation reaction between the aldehyde, specifically formaldehyde, and the amidogen may be carried out at normal or at elevated temperatures at atmospheric, sub-atmospheric or super-atmospheric pressures under neutral, alkaline or acid conditions. However, it is preferred that the polymerization and dehydration be effected under pH conditions in the range of pH 7.0 to 11.0 and preferably in the range of pH 9.0 to 10.0 at a temperature of from 25° C. to 105° C. When it is desired to carry out the condensation reaction under alkaline conditions, any substance yielding an alkaline aqueous solution may be used, for example, alkali metal or alkali earth metal oxides, hydroxides or salts thereof with weak acids, such as sodium, potassium or calcium hydroxide or sodium or potassium carbonate, or primary, secondary and tertiary amines, aqueous ammonia, and the like. Among the acid condensation catalysts that may be employed are inorganic and organic acids, e.g., hydrochloric, sulfuric, phosphoric, formic, acetic, lactic, phthalic, maleic, and the like, and acid salts such as sodium acid sulfate, mono sodium phosphate, mono sodium phthalate, and the like.

The condensation reaction between the amidogen and the aldehyde may be carried out in a single-stage operation, as exemplified in British Patent No. 673,742, wherein all of the aldehyde to be employed is initially present with the amidogen. Alternatively, the condensation reaction may be carried out in multiple stages wherein the aldehyde is added in fractions of the total amount in separate stages. This multiple-stage reaction technique is disclosed in U.S. Patent No. 2,841,571 to H. P. Wohnsiedler, which is incorporated herein by reference. Further details concerning the preparation of amino-aldehyde condensates useful in practicing the present invention are contained in the specific embodiments set forth hereinbelow.

The condensation reaction between the amidogen and the aldehyde may be carried out in an aqueous or non-aqueous medium, with an aqueous medium being preferred. Suitable non-aqueous media are water-soluble alcohols, ketones, and polar materials such as dimethyl formamide, dioxane, tetrahydrofuran and the like. It is preferred that the amino resin be of the non-alkylated type. However, the use of slightly alkylated condensates or combinations of a major portion of unalkylated and a minor portion of alkylated amino resins is contemplated in this invention.

Formaldehyde or compounds engendering formaldehyde, such as paraformaldehyde, hexamethylenetetramine, and the like, are preferred in preparing the thermosetting condensates useful in the compositions of this invention. Nevertheless, for certain applications it may be desirable to use other aldehydes, such as acetaldehyde, propionaldehyde, butyraldehyde, acrolein, methacrolein, crotonaldehyde, benzaldehyde, furfural, etc., as well as mixtures thereof or mixtures of formaldehyde with one or more of these other aldehydes.

The polyacrylamides that may be used in the practice of this invention are substantially homopolymeric materials ranging in molecular weight from about 5,000 (number average) to 1,500,000 (weight average). The number average molecular weight can be determined by osmotic pressure methods, while the weight average molecular weight can be determined by the light scattering method [see Flory, "Principles of Polymer Chemistry" (Ithaca, N.Y.: Cornell University Press, 1953), pages 266 to 316]. The polyacrylamides are characterized as substantially homopolymeric materials because in the present state of the art relating to the preparation of these polymers there is obtained some degree of hydrolysis, usually to an extent not exceeding 6%, of the amide groups present in the monomer subjected to polymerization. Polyacrylamides of controlled molecular weights can be obtained by polymerizing acrylamide in an aqueous medium containing approximately 5% to 40% by volume of a water-miscible alcohol in the presence of a catalyst such as a mixture of hydrogen peroxide and potassium persulfate. Such a procedure is outlined in U.S. Patent No. 2,486,191 to Minsk et al. The polymerization of acrylamide may also be carried out in organic solvents, and this method is particularly adaptable for the preparation of polymers of low molecular weight. In general, lower reaction temperatures and more concentrated monomeric solutions result in polymers having higher molecular weight.

Polyacrylamide of any molecular weight may be employed in the present invention. However, it is preferred that the lower limit of polymer weight be about 100,000 on a weight average basis because in the art of preparing polyacrylamide as practiced at present there is a likelihood of free acrylamide being contained in very low molecular weight polymers. While the presence of free acrylamide does not adversely affect the compositions of this invention, from hygienic considerations attending molding operations involving curing of the modified aminoplasts it is desirable that the polymer does not contain any substantial amounts of free monomeric acrylamide. Polyacrylamides having molecular weights greater than the preferred limit, 1,500,000, can be used. However, the use of extremely high weight polymers presents minor mechanical difficulties incident to the incorporation of the polymer into the aminoplast.

The methylol polyacrylamides can be prepared by reacting an aqueous solution of polyacrylamide with formaldehyde in the presence of a basic catalyst, and preferably in the pH range of from about 8 to 10. Furthermore, it is preferred that the pH of the solution be maintained in said range during its preparation and processing into the modified amino-aldehyde resin, since in acidic media cross-linking and gelation of the methylol polyacrylamide tend to occur, and on drying the polymer becomes essentially insoluble, although it may remain swellable in water. However, polymeric material prepared in acid media may also be used in this invention. In strongly alkaline media, there is a tendency for the amide groups to be hydrolyzed. In place of methylol polyacrylamide, the modifying polymeric material may be prepared by $\alpha,\alpha'$-azobisisobutyronitrile- or other catalyst-induced polymerization of methylol acrylamide. Such polymethylol acrylamide recovered by formation in and precipitation from isopropanol, for example, can be used as a dry, finely divided powder or dissolved in aqueous solution.

The amounts of polyacrylamide or methylol polyacrylamide to be used in modifying the aminoplast can range from about 1% to 45% by weight, based on the total amount of resin solids, that is, the combined weight of aminoplast and modifying homopolymer. The preferred amounts of polyacrylamide or methylol polyacrylamide that may be used to obtain the novel resinuous molding compositions of this invention are from about 5% to 25% by weight, based on the total weight of thermosetting amino resin and homopolymer.

The polyacrylamide or methylol polyacrylamide may be combined with the amino-aldehyde resin by incorporating an aqueous solution of the homopolymer into the amino resin syrup at an early or late stage of reaction, homogeneously mixing the resulting composition, and then drying it. Alternatively, dry polyacrylamide or methylol polyacrylamide may be added to dried amino-aldehyde resin and the resultant mixture then milled in any suitable manner to obtain a homogeneous blend. However, it is preferred that the polyacrylamide modifier be introduced into an amino-aldehyde resin syrup in the form of an aqueous solution, and that the methylol polyacrylamide modifier be introduced as a dry powder. It is also contemplated that the methylolated derivatives of polyacrylamide can be prepared in situ concurrently with the condensation of the amidogen with an aldehyde. Alternatively, dry insolubilized methylol polyacrylamide can be swollen with several times its weight of water and then introduced into the amino-aldehyde resin in the course of mixing with cellulose or otherwise.

The novel thermosetting resinous compositions of this invention may be shaped or formed by molding, extruding, laminating or the like at temperatures ranging, for example, from about 130° C. to 180° C. at pressures varying from about 1,000 to 10,000 p.s.i. They may be molded by compression, injection or transfer molding techniques, all of which are well known in the art.

When the novel thermosetting resinous compositions of the present invention are employed in the preparation of a thermosetting resinous molding composition, a filler, as well known in the art, may be employed. The amount of filler employed will depend upon the ultimate use of the molding composition and the properties sought and, therefore, may vary over wide ranges, e.g., up to as high as 80% by weight, based on the total weight of the final molding composition. Preferably, the amount of filler used, based on the total weight of the molding composition, will be in the order of about 30% by weight. Among the fillers which may be incorporated into the molding composition are α-cellulose, wood flour, walnut shell flour, fibrous or powder asbestos, fiberglass, yarn cuttings, finely divided silicone carbide, carbon black, diatomaceous earth, slate dust, powdered or flaked mica, cloth cuttings, e.g., from silk, rayon, wool, linen, cotton, or nylon cloth or from cloth made from glass fibers or from polymeric or copolymeric acrylonitrile fibers, etc., ground cork, silica, and the like. For certain applications no filler need be present. Obviously, when it is desired to take advantage of the excellent light color-retention properties exhibited by the resinous compositions of this invention, those of the above-mentioned fillers which are white or light colored should be used.

The filler may be incorporated into the resinous composition by any of the means which are well known in the art. Thus, the amino-aldehyde resin syrup containing dispersed polyacrylamide or methylol polyacrylamide may be dried, as for example by tray drying, vacuum concentrating, or the like, to produce a dry composition which may then be comminuted and combined with the filler, as for example, in a ball mill or the like. Alternatively, and preferably, the filler is combined with the amino-aldehyde resin syrup containing the dispersed modifier material in a mixing operation. The homogeneously blended resin-impregnated filler is then dried to a desired volatile content, as for example, in a continuous drier and the material then reduced to a desired particle size suitable for molding by conventional methods.

During the preparation of the molding compositions of this invention dyes, pigments and other colorants may be added for the preparation of colored molding compositions. If desired, mold lubricants such as zinc stearate and the like, curing catalysts such as phthalic anhydride, benzoyl peroxide, benzoic acid, tetrachlorophthalic anhydride and the like, as well as other additives may be combined with the resinous component during the formation of the molding composition.

In order that the present invention may be more completely understood, the following examples are set forth. These examples are set forth primarily for the purpose of illustration and any specific enumeration of detail contained therein should not be interpreted as a limitation on the case except as indicated in the appended claims. All parts and percentages are by weight, unless otherwise stated.

PREPARATION OF POLYACRYLAMIDE

This example illustrates a method for preparing a medium molecular weight grade of polyacrylamide. Into a suitable reaction vessel there were charged:

| Ingredient— | Parts |
| --- | --- |
| Acrylamide | 51.8 |
| Demineralized water | 414.7 |
| Isopropyl alcohol | 7.76 |
| Potassium persulfate | 0.096 |

The monomer and water were added first and warmed to 68° C. under a rapid stream of carbon dioxide. The alcohol and catalyst were then added, causing the reaction temperature to rise to 75–80° C. This temperature range was maintained for two hours. The resulting reaction product was a clear, colorless solution having a viscosity of 3,500 centipoises at 25° C. The average molecular weight of the polyacrylamide produced was about 400,000, as determined by the light scattering method.

*Example I*

An amino-aldehyde resin constituting the condensation product of formaldehyde with melamine wherein the mol ratio of formaldehyde to melamine was 1.3:1, respectively, was prepared as follows. Into a suitable reaction vessel equipped with a stirrer, thermometer and reflux condenser there were charged 2,279 parts of demineralized water, 1,000 parts of a 37% aqueous solution of formaldehyde and a sufficient quantity of 0.5 N aqueous sodium hydroxide solution to effect a pH of 8.6 once the subsequently added melamine had gone into solution. Thereupon, 1,197 parts of melamine were added and heat was applied. The temperature of the reaction mixture was raised, while stirring, from room temperature to reflux (98–102° C.) in approximately one hour, following which the reaction mixture was heated at reflux until a standard condition of hydrophobicity was reached, as was indicated by the appearance of a blue haze when 4 drops of the reaction mixture were added to 25 milliliters of water at 0–3° C. Thereupon, the resinous syrup was rapidly cooled to approximately 65° C. and vacuum concentrated at 23 inches vacuum (approximately 7″ Hg pressure) until 1,946 parts of water removed, thus resulting in a resinous syrup having a resin solids content of 66%. Thereupon, 2,317 parts of a 10% aqueous solution of polyacrylamide having a molecular weight of 500,000 and 670 parts of chopped α-cellulose (sulfite wood pulp cellulose) were incorporated with the melamine resin syrup at 60° C. and homogeneously mixed therewith. The mixture was then tray dried at 70° C. to a volatile content of 1.8%. To the coarse, granular, low density product there was then added 0.5% of its weight of zinc stearate (mold lubricant) and 0.1% of phthalic anhydride (curing catalyst), and the mixture was then ground to a suitable size. The final composition contained approximately 28% filler and 72% resinous materials, of which approximately 13% was polyacrylamide.

A control sample of a melamine resin having a mol ratio of formaldehyde:melamine of 1.3:1, respectively, was prepared in the same manner as above, that is, the melamine and formaldehyde were condensed in an aqueous medium at a pH of 8.5 to the degree of hydrophobidity indicated above and the resinous syrup then vacuum concentrated to a resin solids content of about 65%. To the melamine resin syrup there were then added zinc stearate, phthalic anhydride and chopped α-cellulose in sufficient amounts to yield a molding composition which, on a dry basis, contained approximately 30% filler and 70% melamine resin.

The molding composition containing the polyacrylamide and the unmodified control composition were each divided into two portions, a dry sample and a wet sample, which were thereupon conditioned in the following manner:

Dry samples—dried for 72 hours at 50° C.
Wet samples—exposed in a tray to moist atmospheric conditions to permit moisture pickup.

Test discs were molded from each of these molding compositions, and these discs were then aged for 48 hours at 220° F. The moisture contents of the respective molding compositions, the molding conditions used, and the aging shrinkages of the test discs are given in the following table.

TABLE I

| Resin in Molding Composition | Moisture Content[1] | Molding Time[2] | Aging Shrinkage[3] |
| --- | --- | --- | --- |
| Control (no polyacrylamide): | | | |
| Dry Sample | 0.0 | 5 | 3.5 |
| Wet Sample | 1.9 | 5 | 5.1 |
| Example I (13% polyacrylamide): | | | |
| Dry Sample | 0.0 | 4 | 1.6 |
| Wet Sample | 4.2 | 4 | 4.6 |

[1] Weight percent.
[2] Minutes at 155° C.
[3] In mils per inch.

It can be readily seen from the above data that the discs molded from the combination of polyacrylamide with a conventional melamine-formaldehyde resin showed markedly less shrinkage on aging than those molded from the unmodified control resin, particularly where the molding composition was in the dried state, which is the condition more closely simulating that encountered in industrial molding practice. There was no significant difference in color between the discs molded from the polyacrylamide-modified composition and those molded from the control resin.

While not indicated in Table I, a molding composition was included in this evaluation which was similar in composition to those shown in Table I except that the thermosetting resinous component thereof comprised 90% melamine resin (mol ratio formaldehyde:melamine=1.3:1, respectively) in admixture with 10% of a copolymer of acrylonitrile and acrylamide wherein the weight ratio of acrylonitrile to acrylamide was 10:90, respectively. Shrinkage values obtained for discs molded from this composition were in the order of those obtained for the discs molded from the polyacrylamide-modified composition. However, the color of the discs molded from the copolymer-modified sample was a decided dirty yellow, whereas the unmodified control discs and the polyacrylamide-modified discs were pale white and translucent in appearance.

Example II

A polyacrylamide-modified melamine-formaldehyde condensate having a mol ratio of formaldehyde to melamine of 2:1, respectively, was prepared in the following manner. Into a suitable reaction vessel equipped with a stirrer, thermometer and reflux condenser were charged 1,743 parts of a 37% aqueous solution of formaldehyde and 1,000 parts of demineralized water. The system was adjusted to a pH of 8.5 with triethylamine. Thereupon, 1,355 parts of melamine were added and heat applied to raise the temperature of the reaction mixture to reflux. The reaction mixture was held at reflux until the desired degree of hydrophobity was reached as determined in the manner indicated in Example I. Thereupon, the temperature was reduced to approximately 60° C. and 1,110 parts of polyacrylamide (molecular weight about 500,000) in aqueous solution containing 10% polymer were added and thoroughly dispersed in the reaction mixture. A sufficient amount of 0.5 N aqueous sodium hydroxide was added to the system to compensate for the acidity developed by the addition of the polyacrylamide solution. The resinous composition was then vacuum concentrated to a resin solids content of approximately 70%. Next, 821 parts of chopped α-cellulose were added and thoroughly incorporated with the resin solution. This composition was then dried at 172° F. to a volatile content of 2.8%, following which 0.1% of phthalic anhydride and 0.5% of zinc stearate were added. The unground mix was then ball milled to approximately 80–200 mesh particle size. The molding composition contained approximately 30% filler and 70% resin, the latter consisting of approximately 95% melamine-formaldehyde resin and 5% polyacrylamide.

A control sample of a melamine-formaldehyde resin having a formaldehyde to melamine ratio of 2:1, respectively, was prepared in the same manner as the melamine-formaldehyde resin described above, but without the incorporation of polyacrylamide. This control resin syrup was vacuum concentrated and then admixed with chopped α-cellulose to yield a composition having a filler content possessed by the above polyacrylamide-modified composition. Next, similar quantities of phthalic anhydride and zinc stearate were added to the unground control resin, and the composition was reduced to a particle size range comparable to that of the molding composition of this example containing the polyacrylamide-modified melamine-formaldehyde resin.

As in the previous example, the composition containing the polyacrylamide-modified melamine-formaldehyde resin and the unmodified control composition were divided into two portions, a wet sample and a dry sample, and respective portions of each were conditioned in the manner described in Example I.

Test discs were molded from each of these molding compositions at a temperature of 155° C. for 3 minutes, and these discs were then aged for 48 hours at 220° F. The moisture contents of the respective molding compositions and the aging shrinkages of the test discs are given in the following table.

TABLE II

| Resin in Molding Composition | Moisture Content [1] | Aging Shrinkage [2] |
|---|---|---|
| Control (no polyacrylamide): | | |
| Dry Sample | 0.0 | 3.5 |
| Wet Sample | 3.6 | 15.2 |
| Example II (5% polyacrylamide): | | |
| Dry Sample | 0.0 | 3.3 |
| Wet Sample | 3.6 | 8.8 |

[1] Weight percent.
[2] In mils per inch.

All of the moldings shown in Table II were pale white and translucent in appearance. By comparison an identical composition containing a melamine-formaldehyde resin having a mol ratio of formaldehyde to melamine of 2:1, respectively, modified with 5% of a copolymer of acrylonitrile and acrylamide wherein the weight ratio of acrylonitrile to acrylamide was 10:90, respectively, developed a prominent yellowish hue when molded under the same conditions used for the samples described in Table II.

Example III

This example illustrates the preparation of a methylol polyacrylamide-modified melamine-formaldehyde resin composition wherein the homopolymeric modifier is incorporated into the dry melamine-formaldehyde resin-filler composition by means of milling.

A resinous condensate was prepared from 1,336 parts of melamine, 1,117 parts of a 37% aqueous solution of formaldehyde and 2,547 parts of demineralized water in the same manner as in Example I. The resulting aqueous syrup was vacuum concentrated at 60–65° C. to a resin solids content of 50%. The resinous concentrate was then adjusted to a pH of 9.5–10.0 with 0.5 N aqueous sodium hydroxide. Next, 883 parts of chopped α-cellulose were added and dispersed thoroughly in the resinous concentrate. The resinous concentrate was then tray dried at 70° C. 895 parts of the dried material, together with 105 parts of dry, subdivided methylol polyacrylamide, 0.5% of glyceryl monostearate and 0.1% of phthalic anhydride, were charged to a ball mill and ground to a particle size suitable for molding applications.

A melamine-formaldehyde resin control composition was obtained by withholding from the ball mill a portion of the dry melamine-formaldehyde resin-α-cellulose filler composition described above. This control composition was ground in a ball mill with the same proportions of glyceryl monostearate and phthalic anhydride as in the first part of this example.

The moisture content of both the control composition and the methylol polyacrylamide-modified composition in ground form was 1.9%. Both compositions were molded into test discs, employing a temperature of 340° F. for 3 minutes. After aging the respective test discs for 48 hours at 220° F., the methylol polyacrylamide-modified composition shrank 2.9 mils per inch whereas the unmodified control composition shrank 6.0 mils per inch.

Example IV

This example illustrates the use of polyacrylamide in a melamine-formaldehyde molding composition where the amount of said polyacrylamide is 25% based on the total weight of resinous materials in the molding composition.

A melamine-formaldehyde resin having a mol ratio of formaldehyde to melamine of 1.3:1, respectively, was prepared in the same manner as the resin described in Example III. To a 50% aqueous solution of this melamine-formaldehyde condensation product there was then added an amount of a 10% aqueous solution of polyacrylamide sufficient to give a dispersion containing 25% polyacrylamide and 75% melamine-formaldehyde resin. To this dispersion there was then added an amount of chopped α-cellulose sufficient to result in a final composition consisting of 70% resinous materials and 30% α-cellulose. Drying in this case was carried out at 70° C. until the free moisture content was 2.6%.

For the control, a quantity of the 50% aqueous solution of the melamine-formaldehyde resin was admixed with an amount of chopped α-cellulose sufficient to result in a composition consisting of 70% amino resin and 30% α-cellulose, calculated on a dry basis. This mixture was then tray dried in the manner described above to a free moisture content of 2%.

To each molding composition there was then added 0.5% of glyceryl monostearate and 0.1% of phthalic anhydride, based on the total weight of the resinous components. Each composition was then charged to a ball mill and thoroughly ground.

The ground control composition was molded at a temperature of 155° C. for 4 minutes into a test disc which, after being aged for 48 hours at 220° F., exhibited a shrinkage of 6 mils per inch. The composition containing the polyacrylamide-modified melamine-formaldehyde resin was molded at a temperature of 155° C. for 4½ minutes into a test disc which, after being aged for 48 hours at 220° F., shrank only 2.2 mils per inch.

*Example V*

A benzoguanamine-formaldehyde resin was prepared by reacting benzoguanamine and formaldehyde, in the proportion of one mol of benzoguanamine per two mols of formaldehyde in aqueous medium at reflux temperature and at an initially neutral pH value until precipitation first occurred. Concentration and dehydration were then carried out under reduced pressure to give a dry resin, which was then dissolved at a solids concentration of 60% in a solvent composed of 60 parts by weight of ethylene glycol monomethyl ether and 40 parts of ethanol.

A 1,668 gram portion of this solution was mixed with 538 parts of chopped α-cellulose. This mixture was then dried at 70° C. and then ground wtih lubricant and curing agent to give an unmodified control composition.

A 1,500 gram portion of the solution was introduced into a mixer, followed by 200 parts of water, 538 parts of chopped α-cellulose and 100 parts of polyacrylamide. After mixing, drying was again carried out at 70° C., following which the product was ground with the same curing catalyst and lubricant in the same proportions as in the unmodified composition described above.

Both the benzoguanamine-formaldehyde polyacrylamide-modified molding composition and the unmodified control composition had about the same flow rating under molding conditions. However, the modified resin, when molded, gave products having better texture than could be obtained from the unmodified control composition, and also gave products having improved aging shrinkage, as can be seen from the following table.

TABLE III

| Molding Time [1] | Aging Shrinkage [2] | |
|---|---|---|
| | Control (no polyacrylamide) | Example V (10% polyacrylamide) |
| 2 | | 4.4 |
| 2½ | 5.4 | |
| 3 | | 4.6 |
| 3½ | 5.3 | |
| 4 | | 4.7 |
| 4½ | 5.4 | |

[1] Minutes at 155° C.
[2] In mils per inch after aging for 48 hours at 220° F.

All of the molding described in Table III were pale white and translucent in appearance. It was also noted that modification of the benzoguanamine-formaldehyde resin with copolymers of acrylonitrile and acrylamide, even if the acrylonitrile component of the copolymer was as low as 10%, resulted in molded products having an objectional yellow color, even though this type of modification did reduce aging shrinkage to approximately the same extent as did the homopolymer of acrylamide.

*Example VI*

An aqueous urea-formaldehyde resin syrup was prepared by low temperature reaction of formaldehyde and urea in a mol ratio of 1.3:1, respectively, in aqueous medium under slightly alkaline conditions. When the reaction had advanced to the point at which the free formaldehyde present had decreased to 8.0%, the resin syrup was divided into two parts. One part was mixed directly with α-cellulose pulp, the other with dried, predominantly insoluble but swellable methylol polyacrylamide and α-cellulose, with the resin:cellulose ratio being the same in each case and with the methylol polyacrylamide equal to 10% of the urea-formaldehyde resin in the modified composition. After drying, both compositions were ground and blended in the usual way with lubricant and curing agent. An article molded from the modified resin displayed very good flow, a uniform appearance, significantly better light transmission and lower water absorption (1.2% as against 1.6%) than an article molded in the same manner from the unmodified composition.

One of the effective properties of polyacrylamide as a melamine resin modifier is to lower the heat distortion temperature of the molded resin. Thus, when exposed to temperatures of 140–180° C., the modified cured resin can be softened more effectively than the unmodified. The utility of the modifier for this purpose is described in the following example.

*Example VII*

A melamine-formaldehyde resin syrup containing dissolved polyacrylamide to the extent of 25% of the total solids present was prepared in substantially the same manner as described in Example IV. A lightweight canvas duck fabric was impregnated with this syrup in a continuous operation, with the impregnated fabric then being dried by passing it between banks of infrared lamps. Through double impregnation the resin content of the fabric was increased to 55%. Multiple layers were then laminated to one-eighth inch thickness by curing at 150° C. for five minutes. The resulting laminates were successfully post-formed by heating them to a temperature of 170° C. for 60 seconds between infrared lamps and then rapidly clamping the hot laminates in wooden dies. The temperature was that registered by a thermocouple imbedded in a test laminate. In this manner, curved sheets having a right angle bend with a radius of curvature of ¼ inch were readily formed. Laminates prepared in the same manner from the same melamine-formaldehyde resin which contained no polyacrylamide could not be post-formed in this manner without cracking. Paper filled laminates prepared from polyacrylamide-modified melamine-formaldehyde resin also displayed excellent punching and machining properties.

*Example VIII*

A charge consisting of 504 grams (4 mols) of melamine, 648 grams of a commercially available 37% aqueous solution of formaldehyde [containing 240 grams (8 mols) of formaldehyde] and 0.43 gram of triethylamine was introduced into a suitable reaction vessel equipped with thermometer, stirrer, reflux condenser, and heating and cooling means.

The charge was first stirred for five minutes at room temperature to form a slurry having a pH of 8.4 (glass electrode). Then, while continuing stirring, heating was begun to dissolve the melamine. Ten minutes later, while continuing heating and stirring, 0.03 ml. of a 5 N aqueous solution of formic acid was added to the then clear reaction solution to adjust the pH to 8.2. Thirty-seven minutes after heating was begun the reaction solution reached reflux temperature (95° C.). The reaction solution was held at reflux for twenty-one minutes and then slowly cooled to a temperature of between 50° C. and 60° C. The resulting melamine-formaldehyde resin syrup, having a mol ratio of formaldehyde:melamine of 2:1, respectively, and a resin solids content of 62.5%, was held at 50–60° C. until it was used to make the various molding compositions described hereinbelow.

RESIN A (MODIFIED WITH POLYACRYLAMIDE)

An aqueous solution containing 35 grams of polyacrylamide (average molecular weight approximately 500,000, as determined by the light scattering method), adjusted to alkalinity to Bromothymol Blue, was blended with 168 grams of the above-prepared melamine-formaldehyde resin syrup (corresponding to 105 grams of melamine-formaldehyde resin). The resulting blend was then hand-mixed with 65 grams of chopped α-cellulose fiber, following which the resin-impregnated filler was transferred to a drying tray and oven-dried at a temperature of 170° F. wet bulb, 108° F. dry bulb for 2 hours, with the material being broken up during this time to effect better drying, and then for 2 hours at 122° F., to give a substantially dry material having a volatile content, as determined by heating a small sample for 30 minutes at 150° C., of approximately 7%.

160 grams of this substantially dry material, 0.8 gram of zinc stearate and 0.16 gram of phthalic acid were then ball milled together for 48 hours. The ball milled mixture, after screening through a 30 mesh screen, was ready for use as a molding composition.

RESIN B (MODIFIED WITH A COPOLYMER OF ACRYLONITRILE AND ACRYLAMIDE)

The procedure given above for the preparation of resin A was followed in all respects save the following. The aqueous solution of polyacrylamide was replaced by an aqueous dispersion containing 35 grams of a solid copolymer of acrylonitrile and acrylamide having a weight ratio of acrylonitrile:acrylamide of 50:50, respectively. In addition, the resin-impregnated filler was dried for 1½ hours at a temperature of 170° F. wet bulb, 108° F. dry bulb and then for 2 hours at 122° F. to give a substantially dry material having a volatile content of approximately 7%.

RESIN C (MODIFIED WITH A COPOLYMER OF ACRYLONITRILE AND N-METHYL ACRYLAMIDE)

The procedure given above for the preparation of resin A was again followed in all respects save the following. The aqueous solution of polyacrylamide was replaced by an aqueous dispersion containing 35 grams of a solid copolymer of acrylonitrile and N-methyl acrylamide having a weight ratio of acrylonitrile:N-methyl acrylamide of 50:50, respectively. In addition, the resin-impregnated filler was dried for 2 hours at a temperature of 170° F. wet bulb, 108° F. dry bulb, with no further drying, to give a substantially dry material having a volatile content of approximately 7%.

RESIN D (MODIFIED WITH A COPOLYMER OF ACRYLAMIDE AND ETHYL ACRYLATE

The procedure given above for the preparation of resin A was again followed in all respects save the following. The aqueous solution of polyacrylamide was replaced by an aqueous dispersion containing 35 grams of a solid copolymer of acrylamide and ethyl acrylate having a weight ratio of acrylamide:ethyl acrylate of 50:50, respectively. In addition, the resin-impregnated filler was dried for 150 minutes at a temperature of 170° F. wet bulb and 108° F. dry bulb, with no further drying, to give a substantially dry material having a volatile content of approximately 7%.

The required amount of each of resins A, B, C and D was charged, in turn, to the cavity of a standard disc mold, two inches in diameter by one-sixteenth of an inch deep, and molded at a temperature of 165° C. under a pressure of 4000 p.s.i. for 7½ minutes. The molded discs, after cooling to room temperature, were ready for testing.

Visual inspection of the molded discs showed that the disc molded from resin A was free of yellowing. In contrast to this, the disc molded from resin B had a pronounced yellow color, while the disc molded from resin C had a faint yellow cast. The disc molded from resin D, although free of yellowing, was completely opaque. In fact, the disc molded from resin A, when visually compared with the remaining three discs against a strong light, was far superior in translucence.

The molded discs were then tested for their luminous transmission and reflectance properties according to the method set forth in ASTM D–307, "Standard Method of Test for Spectral Characteristics and Color of Objects and Materials," using a General Electric spectrophotometer with standard illuminant C (the color of the specimen in average daylight) and excluding the specular component of the beam reflected from the specimens. The results of these tests are summarized in the following table:

TABLE IV

| Resin | Percent Luminous Transmittance | Percent Luminous Reflectance |
| --- | --- | --- |
| A | 9.22 | 51.8 |
| B | 4.68 | 61.1 |
| C | 1.36 | 65.6 |
| D | 1.26 | 77.1 |

As can be seen from these results, the disc molded from the melamine-formaldehyde molding composition modified with polyacrylamide is significantly superior in its luminous transmission and reflectance properties as compared to the discs molded from melamine-formaldehyde molding compositions modified with a copolymer of acrylonitrile and acrylamide or N-methyl acrylamide or with a copolymer of acrylamide and ethyl acrylate.

It will be obvious to those skilled in the art that other changes and variations may be made in carrying out the present invention without departing from the spirit and scope thereof as defined in the appended claims.

We claim:

1. A molding and laminating composition which comprises a thermosetting, substantially homogeneous blend of:
    (A) a material selected from the group consisting of polyacrylamide and methylol polyacrylamide, and
    (B) a heat-curable resin prepared by condensing formaldehyde with a compound selected from the group consisting of melamine, benzoguanamine and urea, the weight ratio of said (A) to said (B) being from about 1:99 to 45:55, respectively.

2. A molding and laminating composition which comprises a thermosetting, substantially homogeneous blend of:
    (A) a material selected from the group consisting of polyacrylamide and methylol polyacrylamide, and
    (B) a heat-curable resin prepared by condensing formaldehyde with melamine, the weight ratio of said (A) to said (B) being from about 1:99 to 45:55, respectively.

3. A molding and laminating composition which comprises a thermosetting, substantially homogeneous blend of:
(A) a material selected from the group consisting of polyacrylamide and methylol polyacrylamide, and
(B) a heat-curable resin prepared by condensing formaldehyde with benzoguanamine,
the weight ratio of said (A) to said (B) being from about 1:99 to 45:55, respectively.

4. A molding and laminating composition which comprises a thermosetting, substantially homogeneous blend of:
(A) a material selected from the group consisting of polyacrylamide and methylol polyacrylamide, and
(B) a heat-curable resin prepared by condensing formaldehyde with urea,
the weight ratio of said (A) to said (B) being from about 1:99 to 45:55, respectively.

5. A molding and laminating composition which comprises a thermosetting, substantially homogeneous blend of:
(A) polyacrylamide, and
(B) a heat-curable resin prepared by condensing formaldehyde with melamine,
the weight ratio of said (A) to said (B) being from about 5:95 to 25:75, respectively.

6. A molding and laminating composition which comprises a thermosetting, substantially homogeneous blend of:
(A) methylol polyacrylamide, and
(B) a heat-curable resin prepared by condensing formaldehyde with melamine,
the weight ratio of said (A) to said (B) being from about 5:95 to 25:75, respectively.

7. A molding and laminating composition which comprises a thermosetting, substantially homogeneous blend of:
(A) polyacrylamide, and
(B) a heat-curable resin prepared by condensing formaldehyde with benzoguanamine,
the weight ratio of said (A) to said (B) being from about 5:95 to 25:75, respectively.

8. A molding and laminating composition which comprises a thermosetting, substantially homogeneous blend of:
(A) methylol polyacrylamide, and
(B) a heat-curable resin prepared by condensing formaldehyde with benzoguanamine,
the weight ratio of said (A) to said (B) being from about 5:95 to 25:75, respectively.

9. A molding and laminating composition which comprises of thermosetting, substantially homogeneous blend of:
(A) polyacrylamide, and
(B) a heat-curable resin prepared by condensing formaldehyde with urea,
the weight ratio of said (A) to said (B) being from about 5:95 to 25:75, respectively.

10. A molding and laminating composition which comprises a thermosetting, substantially homogeneous blend of:
(A) methylol polyacrylamine, and
(B) a heat-curable resin prepared by condensing formaldehyde with urea,
the weight ratio of said (A) to said (B) being from about 5:95 to 25:75, respectively.

11. A substantially insoluble and infusible product obtained by heat-curing a thermosetting, substantially homogeneous blend of:
(A) a material selected from the group consisting of polyacrylamide and methylol polyacrylamide, and
(B) a heat-curable resin prepared by condensing formaldehyde with a compound selected from the group consisting of melamine, benzoguanamine and urea,
the weight ratio of said (A) to said (B) being from about 1:99 to 45:55, respectively.

12. A substantially insoluble and infusible product obtained by heat-curing a thermosetting, substantially homogeneous blend of:
(A) a material selected from the group consisting of polyacrylamide and methylol polyacrylamide, and
(B) a heat-curable resin prepared by condensing formaldehyde with melamine,
the weight ratio of said (A) to said (B) being from about 1:99 to 45:55, respectively.

13. A substantially insoluble and infusible product obtained by heat-curing a thermosetting, substantially homogeneous blend of:
(A) a material selected from the group consisting of polyacrylamide and methylol polyacrylamide, and
(B) a heat-curable resin prepared by condensing formaldehyde with benzoguanamine,
the weight ratio of said (A) to said (B) being from about 1:99 to 45:55, respectively.

14. A substantially insoluble and infusible product obtained by heat-curing a thermosetting, substantially homogeneous blend of:
(A) a material selected from the group consisting of polyacrylamide and methylol polyacrylamide, and
(B) a heat-curable resin prepared by condensing formaldehyde with urea,
the weight ratio of said (A) to said (B) being from about 1:99 to 45:55, respectively.

15. A substantially insoluble and infusible product obtained by heat-curing a thermosetting, substantially homogeneous blend of:
(A) polyacrylamide, and
(B) a heat-curable resin prepared by condensing formaldehyde with melamine,
the weight ratio of said (A) to said (B) being from about 5:95 to 25:75, respectively.

16. A substantially insoluble and infusible product obtained by heat-curing a thermosetting, substantially homogeneous blend of:
(A) methylol polyacrylamide, and
(B) a heat-curable resin prepared by condensing formaldehyde with melamine,
the weight ratio of said (A) to said (B) being from about 5:95 to 25:75, respectively.

17. A substantially insoluble and infusible product obtained by heat-curing a thermosetting, substantially homogeneous blend of:
(A) polyacrylamide, and
(B) a heat-curable resin prepared by condensing formaldehyde with benzoguanamine,
the weight ratio of said (A) to said (B) being from about 5:99 to 25:75, respectively.

18. A substantially insoluble and infusible product obtained by heat-curing a thermosetting, substantially homogeneous blend of:
(A) methylol polyacrylamide, and
(B) a heat-curable resin prepared by condensing formaldehyde with benzoguanamine,
the weight ratio of said (A) to said (B) being from about 5:95 to 25:75, respectively.

19. A substantially insoluble and infusible product obtained by heat-curing a thermosetting, substantially homogeneous blend of:
(A) polyacrylamide, and
(B) a heat-curable resin prepared by condensing formaldehyde with urea,
the weight ratio of said (A) to said (B) being from about 5:95 to 25:75, respectively.

20. A substantially insoluble and infusible product obtained by heat-curing a thermosetting, substantially homogeneous blend of:
(A) methylol polyacrylamide, and
(B) a heat-curable resin prepared by condensing formaldehyde with urea,
the weight ratio of said (A) to said (B) being from about 5:95 to 25:75, respectively.

References Cited in the file of this patent

UNITED STATES PATENTS

| | | |
|---|---|---|
| 2,546,841 | Wohnsiedler | Mar. 27, 1951 |
| 2,582,303 | Wohnsiedler et al. | Jan. 15, 1952 |
| 2,841,571 | Wohnsiedler | July 1, 1958 |
| 2,862,901 | Suen et al. | Dec. 2, 1958 |